Oct. 14, 1952     E. MacGREGOR     2,613,477
COMBING AND CUTTING IMPLEMENT
Filed Sept. 10, 1949
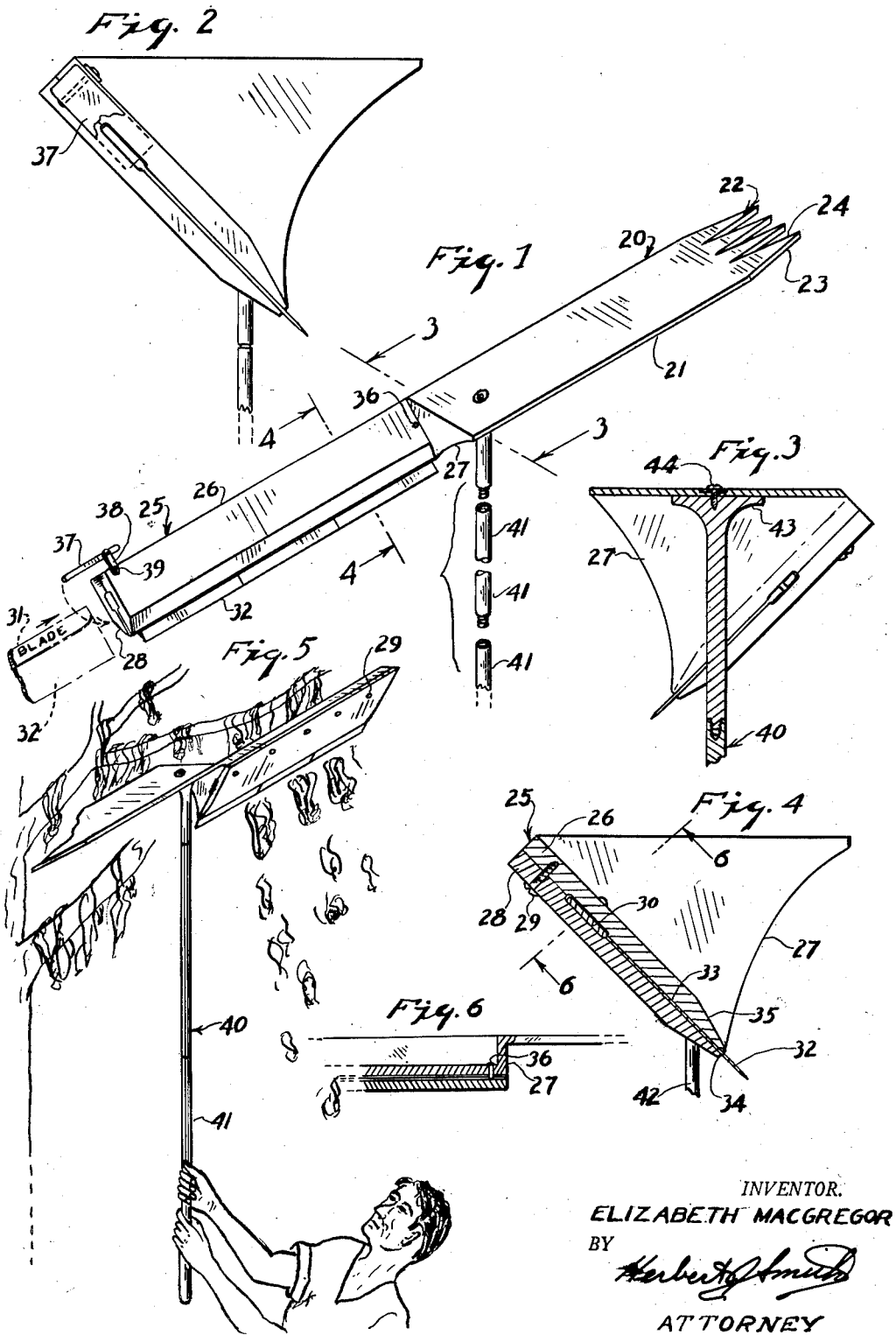
INVENTOR.
ELIZABETH MACGREGOR
BY
ATTORNEY Patented Oct. 14, 1952

2,613,477

UNITED STATES PATENT OFFICE 2,613,477

COMBING AND CUTTING IMPLEMENT

Elizabeth MacGregor, Clearwater, Fla.

Application September 10, 1949, Serial No. 115,080

2 Claims. (Cl. 47—1)

This invention pertains to a combination tool such as a combination cutting and combing implement which is particularly adapted for use in the combing, conditioning, and cutting of moss and the like.

It is well known that Spanish moss which hangs on the branches of trees in clumps will, in time, retard the growth of and ultimately destroy the tree on which it clings. If the moss is not removed the tree will ultimately suffocate. To eliminate this potentiality the moss must be removed from the tree. A conventional way of removing this moss is to have an individual climb on a ladder into the tree and frequently remove the moss from the individual branches. This is not only hazardous work but frequently requires several days per tree primarily necessitated in positioning the ladder or other elevating device on which the workman who removes the moss must stand or support himself.

The present invention obviates the existing method of removing moss and it is an object of the present invention to provide a combination combing and cutting implement which will be simple in construction, light in weight, have a low cost of manufacture, and be readily conditioned and operated.

A further object of the invention is to provide a combing and cutting implement having a utility web connectable to a supporting structure or handle with a combing tool on one end thereof and a cutting tool on the other end thereto.

A further object of the invention is to provide a tool which may be used for trimming moss, cutting down fruit, removing suspended vegetation and the like, which tool has a utility web combining a comb and a cutting device which employs a special blade, or in the present showing in the drawings, a multiplicity of small blades, such as razor blades.

A further object of the invention is to provide a device of the class set forth having a basic supporting structure for connecting to a handle, with a cutting member securely disposed on said supporting structure at an angle thereto to provide a cutting edge inclined at an angle to the moss, fruit, or other vegetation to be conditioned, or cut.

Another object of the invention is to provide a utility web which is connectable to a handle and having a comb adjacent one end thereof and a cutting implement having a blade angularly disposed to the plane of the utility web and having means for positioning a plurality of razor blades thereon and for securely holding said blades in an operative position.

Further and other objects of the invention may be and may become apparent to one skilled in the art from a perusal of the present disclosure. It is to be understood that the present invention is by way of illustration only and that various changes and modifications may be made in the device without departing from the spirit of the subjoined claims.

Throughout the specification like reference numerals refer to like parts.

In the drawings:

Figure 1 is a perspective view of the invention showing the sectionalized handle and the means of loading the several cutting blades into the blade holder portion of the device.

Figure 2 is an end view of the invention, having certain parts broken away to more clearly present the detailed features of the device.

Figure 3 is a sectional view taken along lines 3—3 of Figure 1 showing the guide between the utility web and the blade holder and also for showing a method of securing the handle to the utility web of the invention.

Figure 4 is a sectional view taken along lines 4—4 of Figure 1, showing the blade holder and the means for securing the holder cap onto the holder base.

Figure 5 is a pictorial view partially broken away, showing the invention in use cutting Spanish moss from a tree.

Figure 6 is a sectional view taken along lines 6—6 of Figure 4 showing the blade limiting means secured in the holder base for restricting movement of the blades in one direction when said blades are in position in the blade holder.

Referring to the drawings and more particularly to Figure 1 there is shown a combination combing and cutting implement 20 having a utility web 21 with a comb 22 secured adjacent one end thereto consisting of a plurality of fingers 23 which have the free ends thereof aligned, the fingers 23 have inclined edges 24 with adjacent edges 24 of the fingers being contiguous with each other and with the web 21.

The opposing end of the utility web 21 has a blade holder 25 which consists of a holder base 26 which is an elongated member secured to the utility web 21 by a guide 27. The guide 27 secures the holder base 26 in rigid connection with the utility web at approximately an angle of 45 degrees therewith.

The holder cap 28 is substantially the length of the holder base 26 and is substantially identical in cross sectional shape. The holder cap is threadedly secured to the holder base 26 by means of screws 29, which screws, when once properly secured, provide an elongated slot 30 running substantially the full length of the holder cap 28 and the holder base 26 to receive the head 31 of the razor blades, such as 32.

The razor blade has its cutting portion which fits in a slot 33 formed between the holder cap 28 and the holder base 26 to permit the cutting edge of the razor blade to extend through said slot 33 and protrude beyond the apex end 34 of the blade holder 25. Inclined surfaces 35 are provided to form the apex end 34 of the blade holder 25. The apex end 34, which is actually the front edge of the blade holder 25 extends, as shown, at least the full extent of the razor blades 32.

A limiting pin 36 is shown positioned and secured in the holder base 26 adjacent the guide 27 to act as a limiting means to prevent the razor blades from being removed or falling out of the blade holder 25. A closure 37 has a link 38 secured thereto and is disposed in normal relation to the longitudinal axis of the closure 37. A pivot pin 39 pivotally connects the link 38 to the holder base 26 so that the closure 37 may swing in direction of the arrow after the blade holder has been loaded with razor blades, such as 32.

The closure 37 will be held in its operative position, as shown in Figure 2, by the frictional connection with the pivot pin 39 and the holder base 26. However, a small detent, not shown, may hold the closure 37 in relation to the holder base 26, or any other suitable means may be employed. In Figure 1, the razor blade 32, shown dotted, at the left end of the base holder 25 is disposed relative to the blade holder 25 for the purpose of loading.

While only 3 razor blades 32 are shown in Figure 1, it is to be understood that either more or less blades may be inserted in the blade holder 25 depending on the length of said blade holder, which in turn may be determined, in part, by the particular intended function of the invention.

The handle 40 has a plurality of sections such as 41, each section of which has a threaded male portion on one end thereof, and a threaded female portion on the opposing end thereof, so that the various sections may be connected together to provide a handle length of any desired requirement.

The handle 40 has a primary section 42 with a shoulder 43 formed on one end thereof which engages the underneath surface of the utility web 21 and is secured thereto by a screw 44 or other convenient means. The handle, in its various sections, may be made of metal or wood. However, it is to be understood, that any suitable material or combination of materials may be employed.

In Figure 5, the invention is shown in actual use with a person holding the lower end of the handle 40, with the invention being used to cut Spanish moss from a tree.

The comb 22 has fingers 23 which may be used to condition the moss and position same in elongated strands for the purpose of aligning said strands preparatory to the cutting operation of the blades. The utility web 21 may be useful in segregating the moss in strands after combing by positioning the said web into the moss to form sections or groups of strands.

From the foregoing it will be seen that the combination combing and cutting implement may provide other functions, such as that provided by the utility web. Further, the sectionalized handle may be made of any length in the range of, let us say, 30 feet, so that the user may have a very great range for cutting moss.

The invention may be made of any suitable material, but a preferred embodiment is to use metal. However, fibre or plastic may be used in one form of the invention, depending on its contemplated use.

The guide 27 connecting the blade holder 25 and the utility web 21 is not only used to secure the blade holder to the utility web but acts as a guide to assist in positioning the device relative to the strands of moss to be cut.

What is claimed as new and desired to be secured by Letters Patent of the United States is:

1. A device of the class described having a web, a comb secured to one end of said web comprising a plurality of elongated fingers, a blade holder comprising a holder base and a cap connectable to said holder base, a guide for connecting said blade holder to said web and for securing said holder at an angle thereto, and a sectional handle secured to said web of the device, said handle having its various sections connected one to the other.

2. A device of the class described having a utility web, a comb secured to one end of the utility web comprising a plurality of elongated fingers having inclined edges substantially contiguous with each other and with said web, an elongated blade holder comprising a holder base and a holder cap removably connectable to said holder base, a guide for connecting said blade holder to said utility web and for securing said holder at an angle to said utility web, and a sectional handle secured to the utility web of the device, said handle having its various sections threadedly connected one to the other.

ELIZABETH MacGREGOR.

REFERENCES CITED

The following references are of record in the file of this patent:

UNITED STATES PATENTS

| Number | Name | Date |
|---|---|---|
| 196,265 | Stump | Oct. 16, 1877 |
| 1,133,776 | Wirt | Mar. 30, 1915 |
| 1,166,735 | Annis | Jan. 4, 1916 |
| 1,598,514 | Benner | Aug. 31, 1926 |
| 2,010,325 | Sawyer | Aug. 6, 1935 |
| 2,201,436 | Jones | May 21, 1940 |
| 2,469,012 | Smith | May 3, 1949 |